No. 825,443. PATENTED JULY 10, 1906.
R. B. BENJAMIN.
ELECTRIC LAMP HOLDER.
APPLICATION FILED MAY 7, 1903.
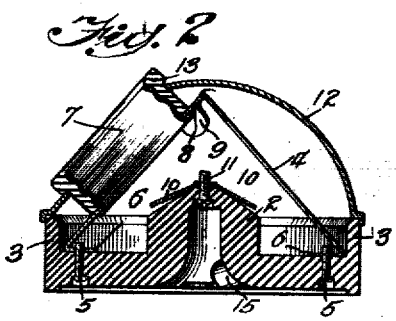
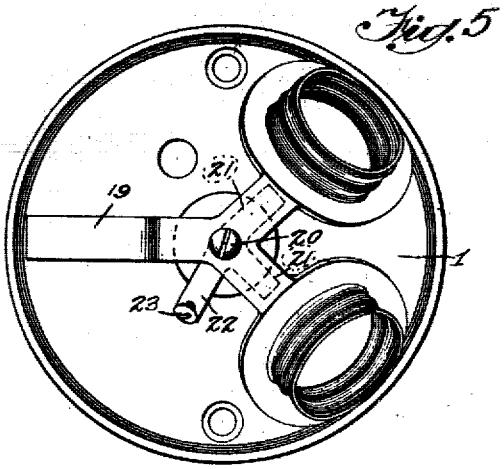
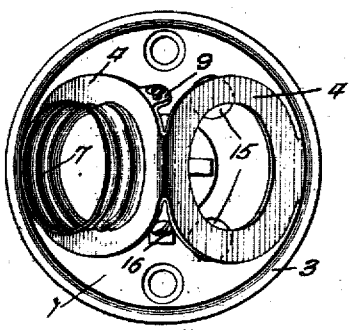
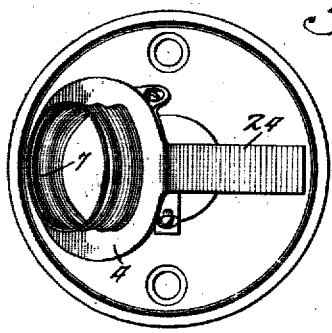
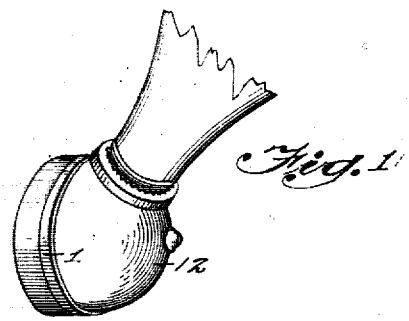
Witnesses:
Edward C. Enfield
Edwin B. H. Towne, Jr.
Inventor:
Reuben B. Benjamin
by Jones & Addington
attys

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRIC-LAMP HOLDER.

No. 825,443.  Specification of Letters Patent.  Patented July 10, 1906.

Application filed May 7, 1903. Serial No. 156,020.

*To all whom it may concern:*

Be it known that I, REUBEN B. BENJAMIN, a citizen of the United States, residing at Chicago, in the county of Cook and State of Illinois, have invented a certain new and useful Improvement in Electric-Lamp Holders, of which the following is a full, clear, concise, and exact description, reference being had to the accompanying drawings, forming a part of this specification.

My invention relates to improvements in electric-lamp holders.

It has for its object to produce a device of this character which is simple in construction, neat in appearance, and cheap of manufacture. The device has also been designed particularly for the purposes which will be hereinafter made apparent.

In the drawings illustrating the preferred embodiment of my invention, Figure 1 is a perspective view of my invention. Fig. 2 is a vertical sectional view. Fig. 3 is a view with the casing and bushing removed, thereby disclosing more particularly the interior arrangement of the parts. Fig. 4 illustrates a modified form of contact-plate. Fig. 5 illustrates another form of my invention with the casing and bushings removed.

In the drawings a suitable base 1 is shown, which is preferably circular and which has a central projection 2 and a circular flange 3 at its edge. Upon said base are arranged annular contact-plates 4, which are preferably held in position by screws 5 passing through said base and threaded into inwardly-turned lugs 6, formed upon said contact-plate. The two contact-plates are preferably formed integral, and one supports a preferably threaded lamp-receiving shell 7, which has an outwardly-turned flange 8, which bears upon the inner side of said contact-plate and is preferably secured thereto by solder or other means. Connected with said contact-plate and preferably formed integral therewith is a terminal or binding post 8 for connecting said plate and one of the supply-wires by means of the binding-screw 9.

Upon the central projection of the base is preferably secured a center-spring contact 10 for the lamp, which is preferably held in position by a screw 11, threaded thereon and passing through said base. Over the base is arranged a preferably semispherical casing 12, which has its edges bearing upon said base and surrounds the parts above described as mounted upon said base. This casing is provided with an aperture to permit the passage of the lamp-base into the lamp-receiving shell and is insulated from said lamp-receiving shell preferably by a bushing 13, which is threaded upon said shell and preferably solely supports the casing in position. The lamp-receiving shell is preferably arranged in such position that the opening in said casing will be arranged at one side of the center thereof, and said lamp-receiving shell is disposed in such manner as to support the lamp in an inclined position to the base. This construction has been particularly designed for supporting a single lamp. The form of lamp-holding device just set forth is particularly adapted to be attached to an elevated support and arranged to project the lamp upwardly in an inclined position, for the lower half of the device, which is presented to view, has an exceptionally-neat appearance.

The supply-wires for the contacts of the lamp-receiving device are passed through holes 15 in the base and one connected to the binding-post carried by the contact-plate supporting the lamp-receiving shell and the other to a binding-post 16, connected with the center contact. In this way said wires and their connections are thoroughly protected from view.

Sometimes it may be desirable to have two lamps supported by the device instead of one, and for this purpose the device shown in Fig. 5 is designed. Therein a circular base is employed, and a casing of a construction similar to that used in the device previously described is also used. The contact-plates for supporting the lamp-receiving devices have their inner ends suitably connected to the base and their outer ends joined and supported from said base by a strip 19. Said strip is provided with a suitable binding-screw 20 for connecting with said contact-plates one of the supply-wires. The center contacts 21 for the lamps are adapted to be connected with the other supply-wire by a binding-post 22, provided with a binding-screw 23.

As in the construction described in Figs. 1 and 2, the lamp-receiving devices are arranged in such a manner that the lamps will be supported at an inclined position to the base. The openings for the passage of said lamps into said lamp-receiving device are located only at one side of the center of the casing. In this way the appearance of the lower portion of the casing is still preserved, and therefore this device may be used in the same manner as the one before described. In Fig. 4 is shown a modification of the contact-plate used in Figs. 1 and 2. Instead of employing a separate ring, as shown in said figures, for supporting the outer end of the contact-plate of the lamp-receiving shell a strip 24 is provided for that purpose.

Many changes may be made in the details of construction and arrangement and combination of parts herein set forth without in any way departing from the spirit of my invention.

Having described my invention, what I claim as new, and desire to secure by Letters Patent, is—

1. In a socket for incandescent lamps, the combination with a suitable base, of a substantially hemispherical metallic casing mounted thereon, lamp-contacts arranged within said casing and a lamp-receiver carried on said base at one side of the center of the base and extending at an angle to the base and adapted to hold the lamp in an angular or inclined position and to project the same toward one edge of the base, said casing being provided with an opening at one side thereof opposite the said receiver to accommodate the lamp, the other side of said casing being continuous, whereby a socket is produced which will securely and rigidly hold the lamp in the desired angular position, substantially as described.

2. In a socket for incandescent lamps, the combination with a suitable base, of a substantially hemispherical metallic casing mounted thereon, lamp-receivers carried on said base at one side of the center of the base, and extending at an angle to the base and adapted to hold the lamps in an angular or inclined position and to project the same toward one edge of the base, said casing being provided with openings at one side thereof, opposite said receivers to accommodate the lamps, the other side of said casing being continuous whereby a socket is produced which will securely and rigidly hold the lamps in the desired angular position, substantially as described.

In witness whereof I have hereunto subscribed my name in the presence of two witnesses.

REUBEN B. BENJAMIN.

Witnesses:
 M. R. ROCHFORD,
 EDWIN B. H. TOWER, Jr.